United States Patent
Erneta et al.

(10) Patent No.: US 7,148,315 B2
(45) Date of Patent: Dec. 12, 2006

(54) MONOMER ADDITION TECHNIQUES TO CONTROL MANUFACTURING OF BIOABSORBABLE COPOLYMERS

(75) Inventors: Modesto Erneta, Princeton Junction, NJ (US); Terry E. Lawler, Baldwin, GA (US)

(73) Assignee: Ethicon, Inc., Somerville, NJ (US)

( * ) Notice: Subject to any disclaimer, the term of this patent is extended or adjusted under 35 U.S.C. 154(b) by 0 days.

(21) Appl. No.: 10/278,494

(22) Filed: Oct. 23, 2002

(65) Prior Publication Data

US 2004/0082755 A1 Apr. 29, 2004

(51) Int. Cl.
C08G 63/06 (2006.01)

(52) U.S. Cl. ............... 528/354; 528/355; 528/357; 528/359; 528/502 R; 525/408; 525/411; 525/413; 525/415; 606/228; 606/230; 606/231; 128/598

(58) Field of Classification Search ........ 528/354–355, 528/357, 359, 502 R; 525/408, 411, 413, 525/415, 416; 606/228, 230–231; 128/898, 128/598
See application file for complete search history.

(56) References Cited

U.S. PATENT DOCUMENTS

| | | | |
|---|---|---|---|
| 3,636,956 A | 1/1972 | Schnelder | |
| 3,839,297 A | 10/1974 | Wasserman et al. | |
| 3,867,190 A | 2/1975 | Schmitt et al. | |
| 4,137,921 A | 2/1979 | Okuzumi et al. | |
| 4,157,437 A | 6/1979 | Okuzumi et al. | |
| 4,243,775 A | 1/1981 | Rosensaft et al. | |
| 4,300,565 A | 11/1981 | Rosensaft et al. | |
| 4,605,730 A | 8/1986 | Shalaby et al. | |
| 4,653,497 A | 3/1987 | Bezwada et al. | |
| 4,700,704 A | 10/1987 | Jamiolkowski et al. | |
| 4,788,979 A | 12/1988 | Jarrett et al. | |
| 4,844,854 A | 7/1989 | Kaplan et al. | |
| 5,080,665 A | 1/1992 | Jarrett et al. | |
| 5,133,739 A | 7/1992 | Bezwada et al. | |
| 5,252,701 A * | 10/1993 | Jarrett et al. ............... 528/354 |
| 5,314,989 A | 5/1994 | Kennedy et al. | |
| 5,403,347 A | 4/1995 | Roby et al. | |
| 5,431,679 A | 7/1995 | Bennett et al. | |
| 5,502,159 A | 3/1996 | Liu | |
| 5,522,841 A | 6/1996 | Roby et al. | |
| 5,554,170 A | 9/1996 | Roby et al. ............... 525/411 |
| 5,633,342 A | 5/1997 | Verser et al. | |
| 5,633,343 A * | 5/1997 | Bezwada et al. ........... 528/361 |
| 5,641,501 A * | 6/1997 | Cooper et al. ............. 424/426 |
| 5,713,920 A * | 2/1998 | Bezwada et al. ........... 606/230 |
| 5,747,637 A | 5/1998 | Shinoda et al. | |
| 5,844,067 A * | 12/1998 | Erneta .................... 528/354 |
| 5,854,383 A | 12/1998 | Erneta et al. ............... 525/408 |
| 5,951,997 A * | 9/1999 | Bezwada et al. ........... 424/426 |
| 6,007,565 A | 12/1999 | Roby et al. ............... 606/228 |
| 6,136,018 A | 10/2000 | Roby et al. ............... 606/228 |
| 6,177,095 B1 * | 1/2001 | Sawhney et al. .......... 424/426 |
| 6,277,927 B1 | 8/2001 | Roby et al. ............... 525/413 |
| 2002/0120291 A1 * | 8/2002 | Shalaby ................... 606/230 |

FOREIGN PATENT DOCUMENTS

| EP | 0 098 394 B1 | 6/1990 |
|---|---|---|
| EP | 0 509 508 A2 | 10/1992 |
| EP | 0 509508 | 10/1992 |

OTHER PUBLICATIONS

Gilding, D.K. and Reed, A.M.; Biodegradable polymers for use in surgery-polyglycolic/poly(actic acid) homo- and copolymers: 1; Polymer; Dec. 1979; vol. 20: pp. 1459-1464.

Kricheldorf, Hans R.; Thomas Mang and J. Michael Jonte; Polylactones. 1. Copolymerization of Glycolide and ε-Caprolactone; Macromolecules 1984; vol. 17, 2173-2181, the month in the date of publication is not available.

* cited by examiner

Primary Examiner—Duc Truong

(57) ABSTRACT

Monomer addition methodology is provided to adjust monomer addition rates to a polymerization reactor. Advantages of the invention include control of bioabsorbable copolymer structure, improvement of monomer conversion, control of reaction temperature, and reduced reaction time. The overall result is an improved process and enhanced product performance. The technology is particularly useful in the copolymerization of monomers with different reactivity ratios, such as glycolide/lactide copolymers and glycolide/caprolactone copolymers. Monomer reactivity ratios and reaction kinetics are utilized to adjust monomer addition rates.

19 Claims, No Drawings

MONOMER ADDITION TECHNIQUES TO CONTROL MANUFACTURING OF BIOABSORBABLE COPOLYMERS

FIELD OF THE INVENTION

The present invention relates to methods for the preparation of bioabsorbable polymers including glycolide/lactide copolymers and glycolide/ε-caprolactone copolymers. The monomer addition reaction is controlled to produce copolymers with improved performance. Specifically, monomer reactivity ratios and reaction kinetics are utilized to adjust monomer addition rates.

BACKGROUND OF THE RELATED TECHNOLOGY

For monomers with different reactivity ratios, the faster reacting monomer reacts to form a homopolymer block with some possible incorporation of the slower reacting comonomer. Thus, the structure of the polymer depends on the reaction rates of the monomers. Consequently, the slower reacting monomer is not fully incorporated into the copolymer structure and remains as unreacted product. Any unreacted product necessitates drying for removal which can cause premature degradation of the copolymer and/or cause poor process performance in subsequent steps. Furthermore, the addition reaction is exothermic which increases reaction temperatures, impacting the polymerization rate of the co-monomers, causing degradation, and impacting control of the molecular weight and scale-up capabilities. In some instances, the slow reacting monomer either has low solubility in the resulting polymer, resulting in two phases, or is never incorporated. Thus, the possible range of the final composition is limited.

Traditional methods of polymerizations are to add the co-monomers to the reactor with the slow reacting monomer added in excess to achieve the final composition. To increase incorporation of the slow reacting monomer and to achieve a random structure the reaction time is extended. This extended time does not give full conversion of the slow reacting monomer and causes degradation of the polymer. Also, the structure is not controlled to achieve different sequences of the monomers.

Blocky polymeric structures are known to be formed by sequentially adding monomers to the reaction vessel over a period of time. Examples of such polymers are Monocryl™, available from Ethicon Corporation, Somerville, N.J. and Maxon™, and Biosyn™, available from Tyco International. In conventional processes used to form bioadsorbable copolymers, one or more monomers are added to the reactor and polymerized. If it is two monomers, the reaction time must be extended to achieve incorporation and randomization. After this time, additional monomer is added to achieve a block segment of this monomer. With this approach, the structure is controlled by reaction rates of the monomers and transesterification, resulting in either a random or block polymer structure.

Methods to improve incorporations of slower reacting monomers with low solubility have not been previously proposed. European Patent No. 098,394 B1 to Casey, et al. ("Casey") mentions that feeding the two monomers (glycolide and trimethylene carbonate) to the reactor in proportion to their reactivity ratios can control the structure of the middle block. However, there is no mention of adjusting the feed rates due to the effects of the changing reactant compositions formed as the reaction proceeds. Casey also fails to provide exemplification or to mention how the monomer feed rates are selected. Casey also is silent as to issues involving decreased solubility of the reactants in the polymer formed, incorporation of the slower reacting monomer and adjustment of the rate of incorporation of the slower monomer in varying the copolymer structure.

Methods of preparing bioadsorbable block polymers have also been proposed. For example, U.S. Pat. No. 4,605,730 to Shalaby et al. describes a two step polymerization method. The first step produces a low molecular weight prepolymer of ε-caprolactone and glycolide. This prepolymer contains more than 60% ε-caprolactone. Once the prepolymer is formed, in the second step, additional glycolide or glycolide/ε-caprolactone is added to the prepolymer, and the resultant mixture is further polymerized.

U.S. Pat. No. 4,700,704 describes surgical sutures made from polymeric materials comprising from about 20 to about 35 weight % ε-caprolactone and from about 65 to about 80 weight % glycolide based sequences. This patent also describes a two step polymerization method. The first step produces copolymers by initially forming a low molecular weight prepolymer of ε-caprolactone and glycolide. This prepolymer contains more than 50 percent ε-caprolactone. Once the prepolymer is formed, in the second step, additional glycolide or glycolide/ε-caprolactone is added to the prepolymer, and the resultant mixture is further polymerized.

U.S. Pat. No. 5,133,739 to Bezwada et al. ("Bezwada") discusses the preparation of an ε-caprolactone/glycolide copolymer, which is the reaction product of a high molecular weight prepolymer of ε-caprolactone and glycolide, and the balance glycolide. However, Bezwada recognizes that there are problems associated with the copolymers where the mole ratio of ε-caprolactone to glycolide is above 45:55. This includes that the solubility of the prepolymer in the glycolide monomer and its compatibility with the developing hard polyglycolide block would not be adequate to prepare a single phase copolymer with the most desirable properties.

Therefore, there is a need for a method of preparing a bioadsorbable copolymer that incorporates a faster reacting monomer and a slower reacting monomer, which allows control over the structure of the copolymer, including the preparation of a block polymer, while maintaining solubility of the monomer in thus formed polymer and preventing premature degradation of the resultant copolymer.

SUMMARY OF THE INVENTION

For the purposes of the present invention, the term biodegradable is meant tot include the terms bioabsorbable and bioadsorbable.

The present invention provides a monomer addition method based on the use of reactivity ratios to provide a specific copolymer structure for a desired purpose, thereby broadening the range of uses for the copolymer structure.

The present invention provides a method of preparing a biodegradable copolymer that includes a faster reacting monomer and a slower reacting monomer, such as glycolide and either lactide or ε-caprolactone, while providing control over the structure of the resultant copolymer. Specifically, the structure is controlled to provide a more uniform distribution of the monomer within the copolymer. The method also prevents or substantially diminishes problems in the prior art associated with poor solubility and premature degradation.

The present invention includes a monomer addition process whereby a reaction vessel is first charged with a composition including a first monomer having a first reaction rate (desirably, the slower reacting monomer), under a predetermined set of reaction conditions, a polymerization catalyst and a polymerization initiator. The second monomer, having a second reaction rate (desirably, the faster reacting monomer), under a predetermined set of reaction conditions, is then added to the reaction vessel at a predetermined rate based on the reactivity ratio of the respective monomers. By subsequent addition of the faster reacting monomer, control over the resultant copolymer structure is controlled. Additionally, control over the temperature, particularly the prevention of temperature spikes during the reaction, is also obtained.

Another aspect of the invention provides the formation of novel biodegradable and/or bioadsorbable copolymers and products made therefrom. These copolymers are the reaction product of a first monomer and a second monomer processed according to the inventive method.

A further aspect of the invention includes the formation of a biodegradable copolymer that incorporates a faster reacting monomer and a slower reacting monomer and which results in a copolymer which includes a sequence length of the slower reacting monomer of greater than 1.2.

A still further aspect of the present invention relates to surgical devices, which include the copolymers of the present invention. Examples of such surgical devices are surgical meshes, surgical staples, sutures, hemostatic clips, burn dressings, hernia patches, medicated dressings, fascial substitutes, gauze, fabric, sheet, felt, sponge for liver hemostasis, gauze bandages, arterial graft or substitutes, bandages for skin surfaces, burn dressings, bone substitutes, needles, intrauterine devices, tubes, surgical instruments, vascular implants, vascular supports, vertebral discs, extra-corporeal tubing, artificial skin, stents, suture anchors, injectable defect fillers, preformed defect fillers, tissue adhesives, tissue sealants, bone waxes, cartilage replacements, hemostatic barriers, tissue scaffolds, monofilament sutures, braided sutures and the like.

DETAILED DESCRIPTION OF THE INVENTION

The method of the present invention includes a monomer addition technique for the preparation of a biodegradable polymer that successfully incorporates a slower reacting monomer into the copolymer structure, together with a faster reacting monomer. Desirably, the slower reacting monomer is either lactide or $\epsilon$-caprolactone and the faster reacting monomer is glycolide. The technique of the present invention provides for the more uniform incorporation of the slower reacting monomer in the copolymer structure with the glycolide.

The methods of the present invention allow for control of the final polymer structure. For example, where two monomers with different reaction rates (one faster and one slower) are reacted to form a polymer, the desired amount of the slower reacting monomer may be incorporated into the copolymer structure. After the slower reacting monomer is added to the reactor, the faster reacting monomer is added to the reactor at a rate that will produce the desired final structure. The rate of addition of the faster reacting monomer is based on the reactivity ratio of the monomers. If the reactivity ratio is not known, this may be calculated through experimentation. The experimental evaluation of the monomer reactivity ratios is based on a careful analysis of the copolymer formed from monomer mixtures at a series of compositions. The data can be analyzed for example by the Fineman and Ross method as described in "Principles of Polymer Chemistry" by Paul J. Flory, Cornell University Press 1969 page 186. The achievement of the desired polymer structure is demonstrated by the relationship between the polymer ratio and the monomer feed ratio, whereby the polymer ratio approaches the monomer feed ratio as the reaction progresses.

The reactor is desirably constructed with melt tanks and metering pumps to control the flow of the faster reacting monomer into the reactor or reaction vessel. The slower reacting monomer(s) are added to the reactor, initially, followed by addition of the faster reacting monomer at a rate calculated to give the desired monomer sequencing, to maintain solubility of the monomer, and to control the exothermic reaction.

Control over the exothermic reaction is to prevent "temperature spikes" or sharp increases in the temperature during the reaction. This is especially important considering that the increase in temperature can cause premature degradation of the resultant copolymer.

Based on the calculations of the reactivity ratios of the monomers, and the molar ratio of the desired copolymer, the amount of the slower reacting monomer that will be added to the reactor is determined. Also based on these calculations, a portion of the glycolide may also be added to the reactor initially.

In a particularly desirably aspect of the invention, all of the slower reacting monomer, catalyst and polymerization initiator are added to the reactor initially. The catalyst, such as stannous chloride or stannous octoate (stannous 2-ethyl hexanoate), is desirably in a small amount, for example, an overall monomer/catalyst ratio of about 40,000:1 to about 250,000:1 is suitable. A greater proportion of polymerization initiator, such as dodecanol or diethylene glycol, is useful. For example, dodecanol or diethylene glycol may be used in an overall monomer:initiator mole ratio range of about 600:1 to about 2,000:1, desirably around 800:1.

The faster reacting monomer, i.e., glycolide, is controllably added to the reactor, meaning that the rate at which this monomer is added is varied during the reaction to substantially maintain the molar ratio (of the individual monomer units) of the resultant copolymer. Carbon 13, NMR may be conducted as the reaction progresses to determine the molar ratio of the product and to make adjustments to the addition rate of the faster reacting monomer. The molar ratio of the components of the copolymer are maintained throughout the reaction which demonstrates the uniformity of the copolymer structure. For example, where desired, the slower reacting monomer will be incorporated into the copolymer, as opposed to the possible inadvertent production of a large glycolide homopolymer block. Based on the percent deviation, the molar ratio will desirably vary less than 40% during the reaction, more desirably, less than about 20%, and even more desirably less than about 10%. The consistency of the molar ratio of the monomers present in the polymer throughout the reaction demonstrates the desired incorporation of the slower reacting monomer into the polymer structure. This is further demonstrated by the sequence length of the slower reacting monomer which may be greater than 1.2.

A wider variety of polymers may be produced by the present invention, than is present in the prior art. This wider variety of polymers is possible by avoiding the limitations of the prior art. The solubility and compatibility problems seen in the prior art are not an issue when using the method of the present invention, which can provide polymers with suitable solubility and compatibility properties having 68-caprolactone/glycolide (cap/gly) molar ratios of greater than 45:55, or more desirably greater than 60:40.

A variety of different configurations of the monomer components may be achieved through the present invention. Segmented polymers, such as block polymers, may be provided. For example, in order to achieve a segmented ABA type block polymer with a B segment prepolymer of both the faster and slower reacting monomers and A segments of glycolide polymer, the center B segment may first be prepared as above. After the completion of the B segment prepolymer, a second amount of glycolide may be added to the reactor and allowed to react to form the A segments.

The copolymer compositions of the present invention are useful for a variety of purposes including for surgical devices. This includes surgical meshes, surgical staples, sutures, hemostatic clips, and the like.

The features and advantages of the present invention are more fully shown by the following examples which are provided for purposes of illustration, and are not to be construed as limiting the invention in any way.

INVENTIVE EXAMPLE 1

Synthesis of a PGA/PLA 89.3/10.5 Copolymer by Controlled Molten Glycolide Addition The initial reactor charge was based on the glycolide and L(−)-lactide reactivity ratios and the intended copolymer composition equation. (Ref. Odian "Principles of Polymerization" McGraw-Hill, 1970, p. 369) (herein incorporated by reference) Reactivity ratios of glycolide and Lactide were determined by the Fineman and Ross method. Using various monomer feed ratios and very short reaction times and analyzing the resultant composition for polymer and unreacted monomers by H NMR. The average glycolide/Lactide molar ratio values, F, of the feed were 1.51, 8.8449, 0.5004 and 0.10538 and the corresponding glycolide/Lactide values, f, in the polymer were 6.088, 33.5, 2.148 and 0.5897

A plot of $F(f-1)/f$ versus $F^2/f$ gave a straight line with a slope of 3.738 and an intercept of −0.149 i.e. the reactivity ratios were $r_1=3.738$ and $r_2=0.149$. Initially, all of the slower reacting monomer, L(−)-lactide, the catalyst and initiator are charged to the reactor with the calculated amount of glycolide. The remaining glycolide is added at a controlled rate from a melt tank to the reactor. First order reaction rate constant for glycolide and lactide for each time interval are utilized for modeling the course of the reaction and to predict the required monomer feed rates needed to reach the reactor monomer ratios that will lead to the desired polymer composition. Overall molar monomer charge is 89/11 glycolide/lactide. The overall monomer:dodecanol mole ratio is 800. Overall monomer/catalyst ratio is 250,000. An advantage of using this very low catalyst is the enhancement of polymer heat stability.

Shown below, in inventive Example 1, is the improved lactide conversion obtained by the monomer addition technique of the present invention, contrasted by the poor lactide incorporation in the conventional process described in comparative Example 2.

Into a reactor provided with stirrer and jacket with heating medium was charged 2.762 kg of L(−)-lactide, 6.466 kg of glycolide, 40.59 grams of dodecanol and 2.11 mL of a 0.33 molar solution of stannous octoate in toluene. The reactor was put under vacuum for 25 minutes, and the vacuum was broken with nitrogen. The vacuum and nitrogen vacuum breaking step was repeated once more. The temperature was increased to 150° C. Molten glycolide was added continuously from a melt tank, through heated lines and a positive displacement heated pump, which was driven by computer interface to regulate flow rate. The reactor contents were sampled, stopping momentarily the glycolide addition, at regular intervals for NMR analysis of the polymer, PGA and PLA, lactide monomer (Lac) and glycolide (GLY). Time, batch temperature, rate of monomer addition and sample compositions are given in Table 1. After 4.5 hours from the start of the molten glycolide addition, the material was pelletized with a strand pelletizer using cold water. Pelletization was completed in 48 minutes. The pellets were dried in a tumble drier for 33 hours under vacuum at room temperature followed by 24 hours at 140° C. and cooling for 6 hours under vacuum. The pellets were of a very light amber color, had an inherent viscosity of 1.41 dl/g as determined on a 0.1 g/dl solution in hexafluoroisopropanol (HFIP) at 25° C. The weight average molecular weight, Mw, as determined by Gel Permeation Chromatography (GPC) was 71,000. The melting point as determined by Differential Scanning Calorimetry, DSC, was 203.9° C. The glass transition temperature Tg=48.7° C. and the crystallization temperature Tc=133.9° C. Table 1 shows the time, temperature, calculated glycolide flow rate and the compositional analysis as the reaction proceeded. The data in table 1 shows that after 5.3 hours from the start of the glycolide addition, the lactide monomer content is only 0.3 mole % and the glycolide content was 1.5 mole %. This is an indication of efficient incorporation of substantially all of the reaction leaving little of the slower reacting monomer as compared to the conventional processes. The molar PGA/PLA composition of the dried pellets was 89.3/10.5 and the overall molar glycolide/lactide charge was 89/11.

TABLE 1

Inventive Example 1: Synthesis of PGA/PLA 89.3/10.5 Copolymer

| Time hr | Temp. ° C. | glycolide flow rate grams/min | PGA m % | GLY m % | PLA m % | Lac m % |
|---|---|---|---|---|---|---|
| 0 | 150 | 8.10 | 59.8 | 16 | 8.9 | 15.3 |
| 0.5 | 188 | 2.41 | 71.5 | 3.6 | 13.9 | 11 |
| 1 | 204 | 3.69 | 74.4 | 0.9 | 17.3 | 7.4 |
| 2 | 206 | 184.75 | 74.2 | 1.4 | 21.3 | 3.1 |
| 3.5 | 207 | 123.42 | 75 | 13.9 | 10.6 | .04 |
| 4.5 | 210 | 0.38 | 83.8 | 5.5 | 10.4 | 0.3 |
| 5.3 | 210 | 0.00 | 87.9 | 1.5 | 10.3 | 0.3 |
| dried | | | 89.3 | 0.1 | 10.5 | 0.1 |

As shown in Table 1, the copolymer was produced with controlled, gradual incorporation of both monomers into the copolymer structure. This resulted in small amounts of unreacted monomer.

Drawn fibers were then produced by conventional means using a vertical extrusion process and drawing process. Extrusion was accomplished using a one-inch extruder equipped with a metering pump and a 28-hole die. Temperature in the extruder ranged from approximately 190 to 290° C. The orientation was a separate step with the fiber drawn to 5× to achieve a 56-denier fiber bundle (2 dpf). Drawing temperature was from 86–91° C.

The 56-denier fiber was braided on a 16 carrier-braider with a three 56-denier core yarns to produce a size of 2/0 braid. After braiding, the material was scoured in ethyl acetate to remove extrusion lubricants, hot stretched ~16% at ~100° C., and annealed at 124° C. for six hours. A coating of 65/35-lactide/glycolide copolymer and calcium stearate was applied.

Test results after conventional sterilization with ethylene oxide are provided in Table 2.

TABLE 2

Sterile Braid Test Results

| Sample | | | Inventive Example 1 | Comparative Example 4 | Typical Results |
|---|---|---|---|---|---|
| Physical Testing | Diameter (mil) | Avg. | 11.28 | 13.23 | 13.11 |
| | | Std. | 0.15 | 0.29 | 0.4472 |
| | Straight Tensile (lbs.) | Avg. | 16.95 | 17.1 | 15.39 |
| | | Std. | 0.70 | 0.53 | 0.5756 |
| | Elongation (%) | Avg. | 27 | 25.54 | 19.2 |
| | | Std. | 1.56 | 1.42 | 1.017 |
| | Knot Tensile (lbs.) | Avg. | 8.11 | 8.05 | 8.14 |
| | | Std. | 0.24 | 0.26 | 0.3194 |
| In vitro | 12 days (lbs.) | Avg. | 12.17 | 12.15 | 8.98 |
| | | Std. | 0.55 | 0.22 | 0.4407 |
| In vivo | 0 day baseline (N = 8) | Avg. | 17.65 | 16.67 | n/a |
| | (lbs.) | S.D. | 0.25 | 0.21 | n/a |
| | In vivo (21 days) (N = 8) | Avg. | 12.27 | 11.79 | 8.842 |
| | (lbs.) | S.D. | 0.81 | 0.35 | 0.5997 |
| | % BSR | | 70 | 70.73 | 60 |
| Absorption | Days to 10% | | | 74 | 66 |

As is shown in Table 2, the braid produced by the product of the inventive method of Example 1 demonstrated improved properties such as greater strength, with a thinner braid as compared to the braid produced by the conventional method of Comparative Example 4.

COMPARATIVE EXAMPLE 2

Conventional Batch Polymerization

The monomer-charge molar ratio was 89/11 glycolide/lactide and the monomer to catalyst molar ratio was 250,000, the same as in Example 1. However, the monomer conversion in this process was significantly lower than in Example 1. Six hours after reaching a temperature of 150° C., the lactide content was 3.4 mole % and the glycolide content was 2.2 mole %. The dried product PGA/PLA composition of 92.9/6.9 demonstrates a significant deviation from the ratio of the product of Example 1, which is a result of the poor lactide conversion in the method of Example 2.

Into a reactor provided with stirrer and jacket with heating medium was charged 1.381 kg of L(−)-lactide, 9.0 kg of glycolide, 30.06 g of dodecanol, and 1.05 mL of a 0.33 molar solution of stannous octoate in toluene. The reactor was put under vacuum for about 30 minutes and the vacuum was broken with nitrogen. The vacuum and nitrogen vacuum breaking step was repeated once. The reactor contents were heated with stirring and samples were taken from the reactor for NMR analysis. The polymer was pelletized and dried in a tumble drier for 13.7 hours under vacuum at room temperature followed by 23 hours under vacuum at 144° C. and 31.6 hours cool down under vacuum. The inherent viscosity of the polymer was 1.59 dl/g in HFIP and the molecular weight Mw=79,000.

Table 3 shows the time, batch temperature, and composition as a function of time. The last column of Table 3 shows how the molar ratio PGA/PLA changed with reaction time.

TABLE 3

Comparative Example 2: Conventional Synthesis of PGA/PLA Copolymer

| Time min | Temp. ° C. | PGA m % | GLY m % | PLA m % | Lac m % | PGA/PLA molar ratio |
|---|---|---|---|---|---|---|
| 10 | 120 | 3.6 | 85.7 | 0.1 | 10.5 | 36.0 |
| 40 | 150 | 19 | 70.4 | 0.6 | 10 | 31.7 |
| 65 | 180 | 50.6 | 38.7 | 2.2 | 8.4 | 23.0 |
| 115 | 200 | 75.5 | 13.9 | 3.9 | 6.7 | 19.4 |
| 145 | 200 | 79.7 | 9.5 | 4.7 | 6.1 | 17.0 |
| 175 | 201 | 81.3 | 8.3 | 5 | 5.5 | 16.3 |
| 205 | 201 | 83.5 | 6 | 5.4 | 5.1 | 15.5 |
| 235 | 201 | 84.4 | 5.2 | 5.6 | 4.8 | 15.1 |
| 265 | 202 | 86.1 | 3.8 | 6 | 4.1 | 14.4 |
| 295 | 199 | 86.9 | 3 | 6.2 | 3.9 | 14.0 |
| 325 | 201 | 87.1 | 2.6 | 6.5 | 3.7 | 13.4 |
| 330 | 201 | 87.2 | 2.6 | 6.4 | 3.8 | 13.6 |
| 380 | 199 | 87.3 | 2.4 | 6.7 | 3.6 | 13.0 |
| 400 | 199 | 87.6 | 2.2 | 6.7 | 3.4 | 13.1 |
| dried | | 92.9 | 0.2 | 6.9 | 0 | 13.5 |

The molar ratio of PGA/PLA is compared to the initial monomer charge ratio of GLY/Lac of 89/11=8.09. Due to the faster rate of reaction of glycolide, the molar ratio of the polymer is considerably higher, especially at the initial stages of the reaction, indicating formation of blocky PGA polymer with some randomly intercalated PLA. As the reaction proceeded, the ratio decreased as more of the lactide is converted to polymer. However, due to the incomplete reaction of lactide, at no point in time did the polymer ratio approach the monomer feed ratio. This also resulted in a much larger amount of unreacted lactide monomer, as compared to Inventive Example 1.

INVENTIVE EXAMPLE 3

Use of Controlled Glycolide Addition to Achieve a More Randomized Structure

Into a reactor provided with stirrer and jacket with heating medium was charged 1.381 kg of L(−)-lactide, 3.234 kg of glycolide, 30.06 g of dodecanol, and 1.05 mL of a 0.33 molar solution of stannous octoate in toluene. The reactor was put under vacuum for about 30 minutes and then the vacuum was broken with nitrogen. The vacuum and nitrogen vacuum breaking step was repeated once. The temperature was increased to 150° C. Molten glycolide was added continuously from a melt tank, through heated lines and a positive displacement heated pump, which was driven by computer interface to regulate flow rate. The reactor contents were sampled, stopping glycolide addition momentarily, at regular intervals for NMR analysis of polymer, PGA and PLA, lactide monomer (Lac.) and glycolide (GLY). Time, batch temperature, rate of monomer addition and sample compositions are provided in Table 4.

TABLE 4

Inventive Example 3: Synthesis of Randomized PGA/PLA Copolymer

| Time hr | Temp. ° C. | glycolide flow rate grams/min | PGA m % | GLY m % | PLA m % | Lac m % | PGA/PLA molar ratio |
|---|---|---|---|---|---|---|---|
| 0 | 110 | | | | | | |
| 15 | 126 | 0.0 | 7 | 62.5 | 0.9 | 26.9 | 7.8 |
| 45 | 150 | 17.0 | 26.7 | 46 | 2.9 | 24.5 | 9.2 |
| 75 | 179 | 65.8 | 66.2 | 10.9 | 7.3 | 15.6 | 9.1 |
| 105 | 193.7 | 53.2 | 71.9 | 11.9 | 8.1 | 8.2 | 8.9 |
| 135 | 200 | 28.1 | 80.5 | 6.3 | 9.2 | 4 | 8.8 |
| 165 | 199.9 | 19.5 | 79 | 9 | 8.8 | 3.2 | 9.0 |
| 195 | 199.8 | 8.7 | 81.6 | 7.2 | 8.6 | 2.7 | 9.5 |
| 225 | 200.1 | 0.0 | 81.9 | 7.9 | 8.2 | 2 | 10.0 |
| 255 | 200.8 | 0.0 | 84.7 | 5.2 | 8.4 | 1.7 | 10.1 |
| 285 | 200.6 | | 86.1 | 3.7 | 8.5 | 1.7 | 10.1 |
| 315 | 201.1 | | 87.8 | 2 | 8.7 | 1.5 | 10.1 |
| 345 | 200.8 | | 88 | 2 | 8.7 | 1.3 | 10.1 |
| 350 | 198 | | 87.8 | 2 | 8.7 | 1.4 | 10.1 |
| 365 | 198 | | 87.9 | 1.9 | 8.7 | 1.4 | 10.1 |
| 380 | 198.5 | | 88 | 1.8 | 8.7 | 1.4 | 10.1 |
| Dried | | | 90 | 0.5 | 8.9 | 0.5 | 10.1 |

As shown in Table 4, the monomer addition technique gives superior lactide conversation and allows for a more randomized structure through the entire polymerization period as evidenced by the more uniform ratios of PGA/PLA. The molar ratio varied only about 7.5% throughout the reaction, based on percent standard deviation.

COMPARATIVE EXAMPLE 4

Conventional Method Increasing Lactide Charge to Achieve Low Catalyst PGA/PLA Compositions Similar to Claim 3

This example shows that to obtain low catalyst PGA/PLA compositions similar to the ones shown in Example 3 by conventional methods, it is necessary to increase substantially the lactide charge to glycolide/lactide of 87.7/12.3, which leaves excess unreacted lactide for drying. The braid properties are shown in Table 2.

Into a reactor provided with stirrer and jacket with heating medium was charged 3.2 kg of glycolide, 52.78 g of dodecanol, and 2.17 mL of a 0.33 molar solution of stannous octoate in toluene. The reactor was put under vacuum for about 30 minutes, and the vacuum was broken with nitrogen. The vacuum and nitrogen vacuum breaking step was repeated once. The reactor contents were heated with stirring and samples were taken from the reactor for NMR analysis. This time, batch temperature, and sample composition as a function of time is given in Table 5. The polymer was pelletized and dried in a tumble drier for 18 hours under vacuum at room temperature followed by 24 hours under vacuum at 140° C. and 4 hours cool down under vacuum. The inherent viscosity of the polymer was 1.41 dl/g in HFIP and the molecular weight Mw=76,000.

TABLE 5

Comparative Example 4: Conventional Low-Catalyst PGA/PLA Synthesis

| Time hr | Temp. ° C. | PGA m % | GLY m % | PLA m % | Lac m % | PGA/PLA molar ratio |
|---|---|---|---|---|---|---|
| 0 | 110 | 1.7 | 85.2 | 0 | 13.1 | |
| 10 | 120 | 3.4 | 84 | 0.3 | 12.3 | 11 |
| 30 | 150 | 21.4 | 66 | 1 | 11.6 | 21 |
| 50 | 180 | 45.1 | 43.3 | 2.3 | 9.3 | 20 |
| 85 | 200 | 86.4 | | 7.8 | 4.2 | 11 |
| 130 | 205.7 | 75.5 | 12.4 | 5.2 | 6.8 | 15 |
| 220 | 207.7 | 84.3 | 3.4 | 7.2 | 5.1 | 12 |
| 295 | 207.1 | 86.2 | 1.7 | 7.9 | 4.2 | 11 |
| 330 | 208.4 | 86.6 | 1.4 | 8.1 | 4 | 11 |
| 375 | 203 | 86.8 | 1.1 | 8.4 | 3.7 | 10 |
| dried | | 90.4 | 0.2 | 8.6 | 0.8 | 11 |

Extrusion and braiding were generally performed as in Example 1. The coated braid properties, after conventional ethylene oxide sterilization are given in Table 2.

INVENTIVE EXAMPLE 5

Preparation of an ABA Type Copolymer

This inventive example relates to the preparation of a segmented ABA type, ε-caprolactone/glycolide copolymer where the center segment, B, is a prepolymer of 45/55 ε-caprolactone/glycolide and the A blocks are polymeric segments from glycolide. The final polymer has a unique structure that leads to strong and pliable sutures of improved breaking strength retention.

Into a reactor provided with stirrer and jacket with heating medium was charged 782 g of ε-caprolactone. Into two separate melt tanks, tank 1 and tank 2, was charged 1534.2 g and 2231.5 g of glycolide, respectively. The reactor and the melt tanks were kept under Hg vacuum for 20 minutes and the vacuum was released with nitrogen. The vacuum and nitrogen breaking step was repeated once. The melt tanks were connected to the reactor through temperature controlled heated lines and heated metering pumps. Heating fluid at about 120° C. and 3.53 g diethylene glycol and 2.38 mL of a 0.33 molar solution of stannous octoate in toluene were added. An additional 472.3 g of ε-caprolactone was added to the reactor. The glycolide from tanks 1 and 2 was delivered to the reactor at the time/batch temperature/calculated flow rate schedule shown in Table 6. Tank 2-glycolide delivery starts at 412 minutes at a rate of 223.1 g/min and was completed approximately in a ten-minute period. At several time intervals, samples were taken for NMR and chemical molar composition analysis of polymer formed, polycaprolactone (PCL) and polyglycolide (PGA), and unreacted monomers ε-caprolactone (cap) and glycolide (gly). Samples were also analyzed for average ε-caprolactone sequence length. Monomer sequence distribution by Carbon-13 NMR was also determined. The polymer was dried in a tumble drier under vacuum for 18 hours at room temperature followed by 24 hours at 110° C. The inherent viscosity was 1.56 dl/g as determined from a 0.1% solution in HFIP. The polymethyl methacrylate equivalent weight, Mw was 74,000. The melting point was 205.2° C. and the heat of fusion was 46.1 J/g. The polymer had an average caproate sequence length of 1.5, compared with a typical value of 1.2 for the conventional polymers of Bezwada. The monomer sequence distributions, where G=glycolate and C=caproate was 3.8 mole % CGC, 22.6 mole % CGGC, and 73.6 mole % >CGGC. These values are significantly different from the typical values of 4.8 mole % CGC, 24.9 mole % CGGC, and 70.3 mole % >CGGC, for a polymer made by conventional process such as those described by Bezwada. The results indicate that the process leads to a less scrambled molecular architecture as reflected by the higher number of average caproate segment length, and the lower mole fraction of the CGC sequence. Higher hydrolytic resistance of the copolymer is believed to be achieved, as reflected in the significant increase in the in vitro properties compared to the conventional process as shown in Table 9.

Table 9 sets forth the improved properties.

TABLE 6

Inventive Example 5: ABA Type PGA/PCL Block Copolymer

| time minutes | batch temp. °C. | gly flow rate rams/min | PGA | Gly | PCL | cap | Computer stage # |
|---|---|---|---|---|---|---|---|
| 0 | 50 | | | | | | |
| 3 | 71 | 20.4 | | | | | 1 |
| 13 | | 0.0 | | | | | 2 |
| 23 | | 0.0 | | | | | 3 |
| 33 | 157 | 0.0 | 10.1 | 3.9 | 4.5 | 81.6 | 4 |
| 43 | | 12.3 | | | | | 5 |
| 53 | | 31.4 | | | | | 6 |
| 63 | 192 | 24.9 | 32.3 | 1.5 | 32.2 | 34 | 7 |
| 73 | | 18.0 | | | | | 8 |
| 83 | | 14.1 | | | | | 9 |
| 97 | 198 | 9.8 | 48.2 | 0.9 | 38.4 | 12.5 | 10 |
| 107 | | 7.5 | | | | | 11 |
| 117 | | 5.8 | | | | | 12 |
| 129 | 197 | 3.8 | 52.6 | 0.9 | 39.3 | 7.3 | 13 |
| 139 | | 3.0 | | | | | 14 |
| 149 | | 2.5 | | | | | 15 |
| 162 | 197 | 0.0 | 53.8 | 0.6 | 40.6 | 5 | 16 |
| 342 | 198 | 0.0 | 52.2 | 0.6 | 43.7 | 3.4 | 34 |
| 352 | | 223.1 | | | | | 35 |
| 362 | | 0.0 | | | | | 36 |
| 412 | 204.9 | 0.0 | 74.1 | 0.9 | 24.8 | 0.2 | 41 |
| 422 | | | 74.3 | 0.7 | 24.9 | 0.1 | start drop |
| | | | 74.2 | 0.8 | 24.9 | 0.1 | end drop |

The polymer was extruded into monofilament sutures with a ¾ inch extruder, 18/1 L/D with a single die hole of 0.040 in. and metering pump of 0.292 cc/revolution. The extrudate was quenched in a water bath and oriented by means of three godets and an air oven located between godet 2 and 3, under the conditions shown in Table 7.

TABLE 7

Inventive Example 5: Extrusion Conditions

| Extrusion conditions | Spool A | Spool B |
|---|---|---|
| Pressures, psi | | |
| barrel 3 | 605 | 570 |
| Screw | 1010 | 985 |
| Pump | 785 | 825 |
| Die | 1620 | 1660 |
| RPM | | |
| Screw | 4.4 | 4.4 |
| Pump | 11.9 | 11.9 |
| Temperatures, °C. | | |
| barrel 1 | 185 | 184 |
| barrel 2 | 215 | 214 |
| barrel 3 | 215 | 215 |
| Pump | 215 | 215 |
| bBlock | 215 | 215 |

TABLE 7-continued

Inventive Example 5: Extrusion Conditions

| Extrusion conditions | Spool A | Spool B |
|---|---|---|
| Die | 215 | 215 |
| Feed Section | 11 | 12 |
| Quench water | 20 | 20 |
| air oven | 138 | 132 |
| Quench Tank | | |
| Air gap, in. | 0.25 | 0.25 |
| Speed, fpm | | |
| quench tank roll | 23 | 23 |
| Godet 1 | 24.5 | 24.5 |
| Godet 2 | 150 | 155 |
| Godet 3 | 160 | 160 |

The extruded monofilaments had the properties listed in Table 8.

TABLE 8

| | Spool A | Spool B |
|---|---|---|
| Diameter (Mils) | 10.96 | 10.97 |
| Straight tensile strength, kpsi | 134.9 | 130.8 |
| Knot tensile strength, kpsi | 68.19 | 68.68 |
| Elongation, % | 33.3 | 31.8 |
| Young Modulus, kpsi | 146.6 | 147.7 |

The monofilaments were annealed under nitrogen for six hours at 105° C. with a 10% relaxation. The annealed filaments had the properties listed in Table 9, compared to a typical filament produced from a polymer made according to Bezwada's method. The increase of in vitro properties is approximately 36% and indicates the better hydrolysis resistance of the novel materials.

TABLE 9

Inventive Example 5: Properties of Annealed Monofilaments

| Annealed monofilaments | Spool A | Spool B | Typical |
|---|---|---|---|
| Diameter, Mils | 11.7 | 11.71 | 11.46 |
| Tensile strength, psi | 111,148 | 111,887 | 109,357 |
| Knot strength, psi | 61,387 | 65,925 | 68,251 |
| Elongation, % | 44.6 | 43.1 | 46.6 |
| In vitro, Lbs | 5.57 | 5.73 | 4.19 |

The in vitro bath temperature was 40.9° C. with sodium phosphate and potassium phosphate buffer at pH=7.27 for 7 days.

INVENTIVE EXAMPLE 6

This example describes a segment ABA type, ε-caprolactone/glycolide copolymer where the center segment, B, was a prepolymer of 63/37 ε-caprolactone/glycolide (cap/gly) and the A blocks were polymeric segments from glycolide. The final polymer had a 35/65 (cap/gly) composition and formed uniform and strong pliable films.

Into a reactor provided with stirrer and jacket with heating medium was charged 1352 grams of ε-caprolactone. Into two separate melt tanks, tank 1 and tank 2, was charged 1033.8 grams and 2235.2 grams of glycolide, respectively. The reactor and melt tanks are kept under 1 mmHg vacuum for 20 minutes and the vacuum was released with nitrogen. The vacuum and nitrogen vacuum breaking step was repeated once. The melt tanks were connected to the reactor through temperature controlled heated lines and heated metering pumps. Heating fluid at about 120° C. was circulated through the tank jackets to melt the glycolide. The reactor temperature was brought up to 50° C. (counted as "0" time) and 3.53 grams of diethylene glycol and 2.38 mL. of a 0.33 molar solution of stannous octoate in toluene were added. An additional 399 grams of ε-caprolactone was added to the reactor. The glycolide from tanks 1 and 2 was delivered to the reactor at the time/batch temperature/calculated flow rate schedule shown in Table 10. Tank 2-glycolide delivery started at 348 minutes at a rate of about 112 grams per minute and was completed approximately in a twenty-minute period. At several time intervals, samples were taken for NMR chemical molar composition analysis of polymer formed polycaprolactone (PCL) and polyglycolide (PGA), unreacted monomers, and ε-caprolactone sequence length. Monomer sequence distribution by carbon 13 NMR was also determined. The polymer was dried in a tumble drier under vacuum for 18 hours at room temperature, followed by 24 hours at 110° C. The inherent viscosity was 1.56 dl/g as determined from a 0.1% solution in HFIP. The weight average molecular weight Mw was 74,000. The dried polymer average caproate segment length was 1.5 and the composition was 64.6% PGA, 0.3% glycolide, 35.1% PLC and 0.0% caprolactone.

TABLE 10

Inventive Example 6: ABA Type PGA/PCL Block Copolymer

| time minutes | batch temp. ° C. | gly flow rate rams/ min | PGA mole % | Gly mole % | PCL mole % | Cap mole % | Computer stage # |
|---|---|---|---|---|---|---|---|
| 0 | 50 | | | | | | |
| 3 | 73 | 15.1 | | | | | 1 |
| 13 | 106 | 0.0 | | | | | 2 |
| 23 | 128 | 0.0 | | | | | 3 |
| 33 | 154 | 0.0 | | | | | 4 |
| 43 | 173 | 11.5 | 2.9 | 5 | 2.4 | 89.7 | 5 |
| 53 | | 26.9 | | | | | 6 |
| 63 | 188 | 28.3 | | | | | 7 |
| 78 | 196 | 5.7 | 28.9 | 1.3 | 17.2 | 52.6 | 8 |
| 83 | | 4.5 | | | | | 9 |
| 97 | 197 | 3.4 | | | | | 10 |
| 108 | | 2.6 | | | | | 11 |
| 118 | | 2.0 | | | | | 12 |
| 128 | 197 | 1.6 | | | | | 13 |
| 138 | | 1.3 | | | | | 14 |
| 148 | | 1.0 | | | | | 15 |
| 158 | 197 | 0.9 | | | | | 16 |
| 168 | | 0.0 | 35.8 | 0.3 | 45.9 | 18.1 | 17 |
| 228 | 198 | 0.0 | 35.7 | 0.2 | 56 | 8.1 | 23 |
| 338 | 200 | 0.0 | 35.8 | 0.3 | 62.8 | 1.2 | 34 |
| 351 | 203 | 111.7 | | | | | 35 |
| 361 | 204.9 | 111.7 | | | | | 36 |
| 416 | | 0.0 | 64.2 | 0.9 | 34.8 | 0.2 | 41 |

INVENTIVE EXAMPLE 7

This example describes a segmented ABA type, ε-caprolactone/glycolide copolymer where the center segment, B, is a prepolymer of 50/50 ε-caprolactone/glycolide (cap/gly) and the A blocks are polymeric segments from glycolide, the final polymer has a 28/72 cap/gly composition. The molar weight is Mw=80,000 and the inherent viscosity is 1.6 dl/g. The NMR analysis shows good monomer conversion.

Into a reactor provided with stirrer and jacket with heating medium was charged 977.1 grams of ε-caprolactone. Into two separate melt tanks, tank 1 and tank 3, was charged 1406.6 grams and 2210.3 grams of glycolide, respectively. The reactor and melt tanks were kept under 1 mmHg vacuum for 20 minutes and the vacuum was released with nitrogen. The vacuum and nitrogen vacuum breaking step was repeated once. The melt tanks were connected to the reactor through temperature controlled heated lines and heated metered pumps. Heating fluid at about 120° C. was circulated through the tank jackets to melt the glycolide. The reactor temperature was brought up to 50° C. (counted as "0"time) and 3.53 grams of diethylene glycol and 2.38 mL. of a 0.33 molar solution of stannous octoate in toluene are added. An additional 426 grams of ε-caprolactone is added to the reactor. The glycolide from tanks 1 and 2 is delivered to the reactor at the time/batch temperature/calculated flow rate schedule shown in Table 11. Tank 2-glycolide delivery starts at 360 minutes at a rate of about 110.5 grams per minute and is completed approximately in a twenty-minute period. At several time intervals, samples are taken for NMR chemical molar composition analysis of polymer formed polycaprolactone (PCL) and polyglycolide (PGA) and unreacted monomers ε-caprolactone (cap) and glycolide (gly). Samples are also analyzed for average ε-caprolactone sequence length. The polymer was dried in a tumbler drier under vacuum for 18 hours at room temperature, followed by 24 hours at 110° C. The composition by NMR analysis was 71.6 mole% PGA, 0.2 mole % glycolide, 28.2 mole % PCL, and 0% caprolactone. The average caproate sequence length was 1.435. The DSC analysis was done at 20° C. per minute in nitrogen. The melting point was 203° C. and the onset of the glass transition temperature (Tg) was 21° C.

TABLE 11

Inventive Example 7: ABA Type PGA/PCL Block Copolymer

| time minutes | batch temp. ° C. | gly flow rate rams/ min | PGA mole % | Gly mole % | PCL mole % | Cap mole % | Computer stage # |
|---|---|---|---|---|---|---|---|
| 0 | 50 | 0.00 | | | | | |
| 3 | 68 | 22.92 | | | | | 1 |
| 13 | 107 | 0.00 | | | | | 2 |
| 23 | 133 | 0.00 | | | | | 3 |
| 33 | | 0.00 | 9.2 | 4.8 | 4.6 | 81.3 | 4 |
| 43 | 180 | 7.57 | | | | | 5 |
| 53 | | 18.93 | | | | | 6 |
| 63 | 189 | 25.27 | 25.3 | 0.7 | 32.4 | 41.6 | 7 |
| | | 18.13 | | | | | 8 |
| | | 10.71 | | | | | 9 |
| 96 | 196 | 8.34 | 42.5 | 0.7 | 35.3 | 21.5 | 10 |
| | | 6.55 | | | | | 11 |
| | | 5.06 | | | | | 12 |
| | | 3.97 | | | | | 13 |
| | | 3.18 | | | | | 14 |
| | | 2.58 | | | | | 15 |
| 157 | 196.6 | 0 | 49 | 0.3 | 41.6 | 9.1 | 16 |
| | | 0 | | | | | 17 |
| 220 | 196.7 | 0 | 48.8 | 0.3 | 46.2 | 4.6 | 22 |
| 350 | | 0 | 48.6 | 0.3 | 49.8 | 1.3 | 35 |
| 360 | 200.3 | 110.5 | | | | | 36 |
| 370 | | 110.5 | | | | | |
| 380 | 204.4 | | | | | | |
| 420 | 205 | | 70.9 | 0.7 | 28.2 | 0.2 | 42 |
| 430 | | | 70.8 | 0.8 | 28.2 | 0.2 | 43 |
| dried | | | 71.6 | 0.2 | 28.2 | 0 | |

As can be seen in Table 11, comparing the molar ratios at 350 min to the molar ratio of the dried copolymer, the structure was an ABA type block copolymer with a "B" section including PGA and PCL, with PGA as the "A"

sections. This experiment proceeded to produce a copolymer with a molar ratio that approached the monomer feed ratio for the "B" section indicating the desired incorporation of caprolactone, with only a small amount of unreacted monomer remaining.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. A method of producing a bioabsorbable copolymer comprising the steps of:
   (a) charging a reaction vessel with a first composition comprising
      (i) a first monomer having a first reaction rate under a predetermined set of reaction conditions,
      (ii) a polymerization catalyst, and
      (iii) a polymerization initiator;
   (b) providing a second composition comprising a second monomer having a second reaction rate, which is faster than said first reaction rate, under said predetermined set of reaction conditions;
   (c) controllably adding to the reaction vessel said second composition; and
   (d) forming a reaction product including a molar ratio of said first monomer to said second monomer,
   wherein said second composition is added to the reaction vessel at a rate which substantially maintains the molar ratio of said first monomer to said second monomer in the resultant copolymer.

2. The method of claim 1, wherein said second composition is added to the reaction vessel at a rate which maintains a variance in said molar ratio up to about 20%.

3. The method of claim 1, wherein said first monomer is a member selected from the group consisting of $\epsilon$-caprolactone, lactide and lactones.

4. The method of claim 1, wherein said second monomer is glycolide, lactones, trimethylene carbonate, and p-dioxanone.

5. The method of claim 1, wherein said first monomer is $\epsilon$-caprolactone, said second monomer is glycolide, and the molar ratio of $\epsilon$-caprolactone to glycolide is greater than about 45:55.

6. The method of claim 5, wherein said molar ratio is greater than about 60:40.

7. The method of claim 1, wherein said second composition is added at a rate that prevents high temperature spikes.

8. The method of claim 1, wherein said second composition is added at a rate that controls desired relative amounts of monomer incorporated the structure of said copolymer.

9. The method of claim 1, further comprising the step of providing a second addition of said second composition to produce a segmented polymer.

10. The method of claim 9, wherein said segmented polymer is a block polymer.

11. A bioabsorbable copolymer comprising the reaction product of a first monomer and a second monomer comprising the steps of:
   (a) charging a reaction vessel with a first composition comprising (i) said first monomer having a first reaction rate under a predetermined set of reaction conditions, (ii) a polymerization catalyst, and (iii) a polymerization initiator;
   (b) providing a second composition comprising said second monomer having a second reaction rate, which is faster than said first reaction rate, under said predetermined set of reaction conditions;
   (c) controllably adding to the reaction vessel said second composition; and
   (d) forming a reaction product including a molar ratio of said first monomer to said second monomer,
   wherein said second composition is added to the reaction vessel at a rate which substantially maintains the molar ratio of said first monomer to said second monomer in the resultant copolymer.

12. The reaction product of claim 11, further comprising the step of providing a second addition of said second composition to produce a segmented polymer.

13. The reaction product of claim 12, wherein said segmented polymer is a block polymer.

14. The reaction product of claim 13, wherein said block polymer comprises a segmented ABA structure.

15. The reaction product of claim 14, wherein said B segment comprises a prepolymer of $\epsilon$-caprolactone/glycolide.

16. The reaction product of claim 15, wherein said prepolymer has a molar ratio of greater than 45:55 $\epsilon$-caprolactone/glycolide.

17. A bioabsorbable surgical device comprising the copolymer reaction product formed by the steps comprising:
   (a) charging a reaction vessel with a first composition comprising
      (i) said first monomer having a first reaction rate under a predetermined set of reaction conditions,
      (ii) a polymerization catalyst, and
      (iii) a polymerization initiator;
   (b) providing a second composition comprising said second monomer having a second reaction rate, which is faster than said first reaction rate, under said predetermined set of reaction conditions;
   (c) controllably adding to the reaction vessel said second composition; and
   (d) forming a reaction product including a molar ratio of said first monomer to said second monomer,
   wherein said second composition is added to the reaction vessel at a rate which substantially maintains the molar ratio of said first monomer to said second monomer in the resultant copolymer.

18. The surgical device of claim 17, wherein said surgical device is a member selected from the group consisting of surgical meshes, surgical staples, hemostatic clips, burn dressings, hernia patches, medicated dressings, fascial substitutes, gauze, fabric, sheet, felt, sponge for liver hemostasis, gauze bandages, arterial graft or substitutes, bandages for skin surfaces, burn dressings, bone substitutes, needles, intrauterine devices, tubes, surgical instruments, vascular implants, vascular supports, vertebral discs, extra-corporeal tubing, artificial skin, stents, suture anchors, injectable defect fillers, preformed defect fillers, tissue adhesives, tissue sealants, bone waxes, cartilage replacements, hemostatic barriers, tissue scaffolds, monofilament sutures, braided sutures and the like.

19. A method of producing a bioabsorbable copolymer comprising the steps of:
   (a) charging a reaction vessel with a first composition comprising
      (i) a first monomer having a first reaction rate under a predetermined set of reaction conditions, (ii) a polymerization catalyst, and
(iii) a polymerization initiator;
(b) providing a second composition comprising a second monomer comprising glycolide having a second reaction rate, which is faster than said first reaction rate, under said predetermined set of reaction conditions;
(c) controllably adding to the reaction vessel said second composition; and
(d) forming a reaction product including a molar ratio of said first monomer to said second monomer, wherein said second composition is added to the reaction vessel at a rate which substantially maintains the molar ratio of said first monomer to said second monomer in the resultant copolymer.

* * * * *